United States Patent
Su et al.

(10) Patent No.: US 9,688,866 B2
(45) Date of Patent: Jun. 27, 2017

(54) METHOD OF MANUFACTURING HYDROPHOBIC ANTIFOULING COATING MATERIAL AND METHOD OF FORMING HYDROPHOBIC ANTIFOULING COATING FILM

(71) Applicants: INDUSTRIAL TECHNOLOGY RESEARCH INSTITUTE, Hsinchu (TW); Behr Process Corporation, Santa Ana, CA (US)

(72) Inventors: Yi-Che Su, Zhubei (TW); Wei-Cheng Tang, Hsinchu (TW); Yuung-Ching Sheen, Hsinchu (TW); Yun-Shan Huang, Zhunan Township (TW); Ming-Ren Tarng, Irvine, CA (US); Chenchen Xue, Irvine, CA (US)

(73) Assignees: INDUSTRIAL TECHNOLOGY RESEARCH INSTITUTE, Hsinchu (TW); BEHR PROCESS CORPORATION, Santa Ana, CA (US)

( * ) Notice: Subject to any disclaimer, the term of this patent is extended or adjusted under 35 U.S.C. 154(b) by 677 days.

(21) Appl. No.: 14/142,319

(22) Filed: Dec. 27, 2013

(65) Prior Publication Data

US 2015/0183999 A1 Jul. 2, 2015

(51) Int. Cl.
- *C09D 5/16* (2006.01)
- *C09D 183/08* (2006.01)
- *C08G 77/24* (2006.01)

(52) U.S. Cl.
CPC ......... *C09D 5/1675* (2013.01); *C09D 5/1625* (2013.01); *C09D 5/1687* (2013.01); *C09D 183/08* (2013.01); *C08G 77/24* (2013.01)

(58) Field of Classification Search
None
See application file for complete search history.

(56) References Cited

U.S. PATENT DOCUMENTS

| 6,465,565 B1 | 10/2002 | Garcia et al. |
| 7,196,043 B2 | 3/2007 | Valpey, III et al. |

(Continued)

FOREIGN PATENT DOCUMENTS

| AU | 2003286586 A1 | 5/2004 |
| CA | 2 503 059 A1 | 5/2004 |

(Continued)

OTHER PUBLICATIONS

Taiwanese Office Action dated Feb. 9, 2015, in Taiwanese Application No. 103108328.

*Primary Examiner* — Erma Cameron
(74) *Attorney, Agent, or Firm* — Birch, Stewart, Kolasch & Birch, LLP

(57) ABSTRACT

A method of manufacturing a hydrophobic antifouling coating material, including: (a) mixing a sol-gel precursor, water, an aqueous colloidal silica suspension, and a catalyst to perform a sol-gel reaction to form a solution having particles therein, wherein the sol-gel reaction is performed without addition of any organic solvent; (b) chemically modifying the particles with a hydrophobic agent to form surface-modified particles; and (c) adding a surfactant to the solution containing the surface-modified particles to form a hydrophobic antifouling coating material. The hydrophobic antifouling coating material can be dispersed in an aqueous solution, and has properties such as low VOC (Volatile organic compound) value, high solid content, and high stability.

11 Claims, 1 Drawing Sheet

(56) References Cited

U.S. PATENT DOCUMENTS

| | | |
|---|---|---|
| 7,544,411 B2 | 6/2009 | Baumann et al. |
| 7,744,953 B2 | 6/2010 | Huang et al. |
| 2005/0260421 A1* | 11/2005 | Wielstra ............... B05D 5/083 428/447 |
| 2008/0156224 A1* | 7/2008 | Su ........................ B05D 5/08 106/13 |
| 2008/0221263 A1 | 9/2008 | Kanagasabapathy et al. |
| 2008/0245260 A1* | 10/2008 | Campazzi ............. B82Y 30/00 106/14.41 |
| 2010/0167066 A1 | 7/2010 | Yoo et al. |
| 2013/0089670 A1 | 4/2013 | Su et al. |

FOREIGN PATENT DOCUMENTS

| | | |
|---|---|---|
| CN | 1845975 A | 10/2006 |
| CN | 101768381 A | 7/2010 |
| CN | 103044973 A | 4/2013 |
| EP | 1 038 919 A1 | 9/2000 |
| EP | 1 556 457 A0 | 7/2005 |
| TW | I261615 | 9/2006 |
| TW | 201315782 A1 | 4/2013 |
| WO | WO 93/01349 A1 | 1/1993 |
| WO | WO 2004/037944 A1 | 5/2004 |
| WO | WO 2005/047358 A1 | 5/2005 |

* cited by examiner

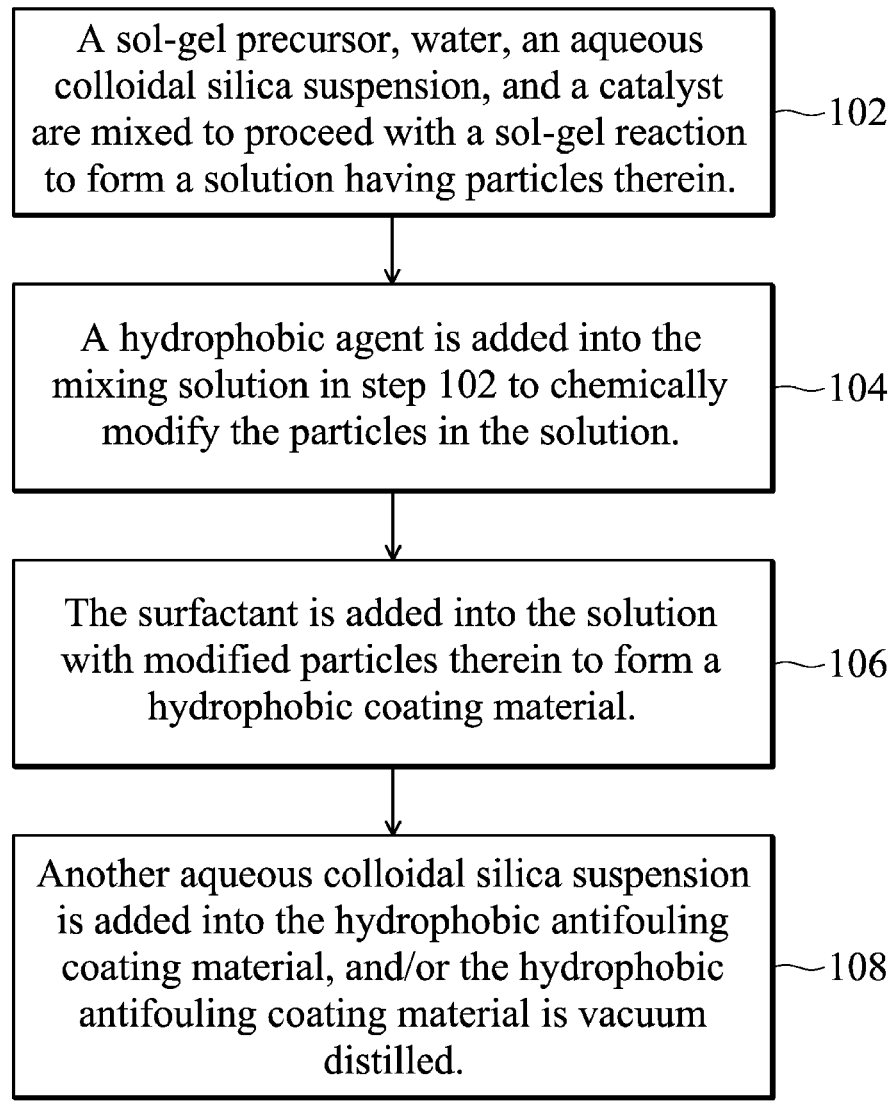

METHOD OF MANUFACTURING HYDROPHOBIC ANTIFOULING COATING MATERIAL AND METHOD OF FORMING HYDROPHOBIC ANTIFOULING COATING FILM

TECHNICAL FIELD

The technical field relates to a method of manufacturing a hydrophobic antifouling coating material and a method of forming a hydrophobic antifouling film.

BACKGROUND

In general, surfaces of all substrates are easily stained after use, and cleaning of some of them is very difficult or requires the use of highly corrosive detergents. Using these detergents might be harmful for humans and the environment. Therefore, various antifouling or self-cleaning materials have been developed to maintain the cleanliness of substrates.

However, in today's processes for manufacturing antifouling coating materials, such as in a sol-gel reaction process, great amounts of organic solvents (such as alcohols, toluene, tetrahydrofuran, and so on) are required. Thus, the resulting coating materials contain a great amount of organic solvents (for example, over 90 wt %). These coating materials have a high volatile organic compound (VOC) value, for example, between 800 g/L and 900 g/L or even higher, therefore potentially resulting in environmental pollution.

Conventionally, in a sol-gel reaction for manufacturing a hydrophobic antifouling coating material, the reaction must be performed in an organic solvent due to the reactants being unstable in an aqueous solution, or having phase-separation or gelation problems. Although some waterborne resins, such as waterborne polyurethane (waterborne PU), have been used to proceed a sol-gel reaction in an aqueous solution, some organic solvents are still required in the process to stabilize the reaction. In addition, the resulting coating materials usually have poor hydrophobicity, and therefore are not appropriate for use as antifouling materials. Furthermore, waterborne polyurethane has poor weather-resistance and hardness, and is not suitable for outdoor use. Moreover, the molecular weight of the waterborne polyurethane is large and it has poor compatibility with existing systems, and as such its applications are limited.

Therefore, a novel antifouling coating material with a low VOC value is now required.

SUMMARY

One embodiment of the disclosure provides a method of manufacturing a hydrophobic antifouling coating material, comprising: (a) mixing a sol-gel precursor, water, a first aqueous colloidal silica, and a catalyst to perform a sol-gel reaction to form a solution having particles therein, wherein the sol-gel reaction is performed without using any organic solvent; (b) chemically modifying the particles with a hydrophobic agent to form surface-modified particles; and (c) adding a surfactant to the solution containing the surface-modified particles to form a hydrophobic antifouling coating material.

One embodiment of the disclosure provides a method of forming a hydrophobic antifouling coating film, comprising: forming the hydrophobic antifouling coating material by the described method; coating the hydrophobic antifouling coating material on a substrate; and drying or solidifying the hydrophobic antifouling coating material to form a hydrophobic antifouling coating film.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 1 shows a method of manufacturing a hydrophobic antifouling coating material in one embodiment of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In one embodiment, a hydrophobic antifouling coating material which can be manufactured without using any organic solvent is provided. The coating material can be dispersed into an aqueous solution with a low VOC value and a high stability, thereby being an eco-friendly antifouling coating material.

FIG. 1 shows a method of manufacturing a hydrophobic antifouling coating material in one embodiment of the disclosure. Referring to step 102 in FIG. 1, a sol-gel precursor, water, an aqueous colloidal silica suspension, and a catalyst are mixed to proceed a sol-gel reaction for forming a solution having particles therein. In one embodiment, the reactant ratios are shown as below: 1 part by weight of the sol-gel precursor, 50 to 99.9 parts by weight of water, 0.01 to 30 parts by weight of an aqueous colloidal silica of the aqueous colloidal silica suspension, and 0.01 to 5 parts by weight of the catalyst. An overly high amount of the water may cause precipitation or gelation. An overly low amount of the water may result in an incomplete reaction. An overly high amount of the aqueous colloidal silica of the aqueous colloidal silica suspension may lower the adhesion of the coating material with the substrate. An overly low amount of the aqueous colloidal silica of the aqueous colloidal silica suspension may induce resultant VOC of coating being too high. An overly high amount of the catalyst may lead the solution to be not compatible with resins or to corrode the substrate. An overly low amount of the catalyst may bring on larger particle sizes and even the precipitation in solution.

The sol-gel precursor may have, for example, a —SiOR or —SiOH functional group, wherein R is $C_nH_{2n+1}$, and n is a positive integer. Examples for the sol-gel precursor may be tetramethoxysilane (TMOS), tetraethoxysilane (TEOS), titanium tetraisopropoxide, titanium tetramethoxide, titanium tetraethoxide, titanium tetrabutoxide, aluminum tri-sec-butoxide, or zirconium n-butoxide. The aqueous colloidal silica suspension may be, for example, LUDOX® TMA, Lithium Polysilicate, or Ludox® AS-30. The catalyst may be, for example, organic acid/base or inorganic acid/base, such as hydrochloric acid, sulfuric acid, nitric acid, acetic acid, potassium hydroxide, sodium hydroxide, ammonium, or the like.

The sol-gel reaction in step 102 may not require any organic solvent, such that the resulting coating material can have a low VOC value. By contrast, an organic solvent is generally used in a conventional sol-gel reaction to stabilize the reactant. In one embodiment, the sol-gel reaction can be reacted for about 1 hour to about 3.5 hours without using the organic solvent. It has been confirmed by experiments that, in a sol-gel reaction process without using any organic solvent, the reactant may be less stable due to the lack of organic solvent, and when the reaction time is too long, for example more than 3.5 hours, the mixed solution cannot continue the sol-gel reaction due to gelation or precipitation. However, if the reaction time is not long enough, for example, less than 1 hour, the sol-gel reaction may be incomplete. The sol-gel reaction in step 102 may be performed at room temperature, or at approximately 15° C. to 40° C. An overly high reaction temperature easily causes the reaction solution to become gelatinized or precipitated. An overly low reaction temperature easily causes the reaction be incomplete.

Next, referring to step 104 in FIG. 1, a hydrophobic agent is added to the solution having the particles in step 102 to chemically modify the particles. In one embodiment, 0.01 to 30 parts by weight of the hydrophobic agent is utilized on the basis of 1 part by weight of the sol-gel precursor. An overly high amount of the hydrophobic agent may cause the product price is too expensive. An overly low amount of the hydrophobic agent may result in a bad anti-fouling property.

The hydrophobic agent may be, for example, a silicon-based hydrophobic agent, a fluorine-based hydrophobic agent, a carbohydrate hydrophobic agent, a hydrocarbon hydrophobic agent, or combinations thereof. Examples of the silicon-based hydrophobic agent may be siloxane, silane, silicone, or a combination thereof. Examples of the fluorine-based hydrophobic agent may be fluorosilane, fluoroalkylsilane, polytetrafluoroethylene (PIPE), polytrifluoroethylene, polyvinyl fluoride, functional fluoroalkyl compound, or combinations thereof. Examples of the carbohydrate hydrophobic agent or the hydrocarbon hydrophobic agent may be reactive wax, polyethylene, polypropylene, or combinations thereof.

In step 104, since the hydrophobic agent and the solution having particles therein are separated into two layers (phases) after mixing, the chemical modifying reaction substantially occurs at an interface between the solution and the hydrophobic agent. After the reaction continues for a period of time, for example, after 1 hour to 2 hours, the hydrophobic agent may be substantially grafted to the particles. An overly short reaction time may lead to an incomplete reaction and lower the anti-fouling property. An overly long reaction time may bring on the higher cost of manufacturing. The reaction may be performed at room temperature, or at about 15° C. to 40° C. An overly high reaction temperature may cause precipitation or gelation. An overly low reaction temperature may induce a lower rate of reaction and even incomplete reaction.

Next, referring to step 106 in FIG. 1, a surfactant is added to the solution with modified particles therein to form a hydrophobic antifouling coating material. In one embodiment, 0.01 to 5 parts by weight of the hydrophobic agent is utilized on the basis of 1 part by weight of the sol-gel precursor. If there is too little surfactant, the modification reaction may be incomplete or the resulting product may not be stable in an aqueous solution. However, if there is too much surfactant, the hydrophobicity of the resulting hydrophobic antifouling coating material may decrease and the cost of the process may increase.

The surfactant may be, for example, an anionic surfactant, a combination of an anionic surfactant and a cationic surfactant, a combination of an anionic surfactant and a nonionic surfactant, a combination of anionic surfactant and an amphoteric surfactant, or combinations thereof.

In step 106, the remaining hydrophobic agent is brought into the solution by the surfactant, such that the modification of the particles is completed. This step usually requires a longer reaction time, such as between 12 hours and 24 hours. An overly short reaction time may cause the solution remaining separated as two layers or an incomplete reaction. An overly long reaction time may generate the higher cost of production. By adding the surfactant, the resulting hydrophobic antifouling coating material can be stable in an aqueous solution, and will not be separated into different phases due to the hydrophobic characteristics after a period of time. In addition, the addition of the surfactant should be performed after the particles in the mixed solution are substantially modified. If the surfactant and the hydrophobic agent are simultaneously added to the solution having the particles, the particles will be incompletely modified with phase separation.

The method of manufacturing the hydrophobic antifouling coating material includes the main steps 102, 104, and 106. In one embodiment, step 102 is performed without using any organic solvent. In another embodiment, steps 102, 104, and 106 are performed without using any organic solvent. The hydrophobic antifouling coating material manufactured by a sol-gel reaction without using any organic solvent may have a low VOC value (e.g. less than 100 g/L), thereby being an eco-friendly coating material.

Alternatively, step 108 is optionally performed after steps 102, 104, and 106. Step 108 involves adding another aqueous colloidal silica suspension into the hydrophobic antifouling coating material, and/or vacuum distilling the hydrophobic antifouling coating material. In one embodiment, 0.01 to 30 parts by weight of an aqueous colloidal silica of another aqueous colloidal silica suspension is utilized on the basis of 1 part by weight of the sol-gel precursor. An overly high amount of the aqueous colloidal silica of another aqueous colloidal silica suspension may lower the film-forming ability and the adhesion on surface. An overly low amount of the aqueous colloidal silica of another aqueous colloidal silica suspension may bring on a higher VOC of coating. Note that another aqueous colloidal silica suspension in step 108 cannot replace the aqueous colloidal silica suspension in step 102. For example, if no aqueous colloidal silica is added in step 102 and another aqueous colloidal silica is added in step 108, the adherence between the coating film and the substrate will be degraded. Otherwise, the vacuum distilling step may further remove the side product (alcohol) in the sol-gel reaction of step 102. The vacuum distilling step not only increases the solid content but also decreases the VOC of the hydrophobic antifouling coating material.

Accordingly, by controlling the reaction time and/or the reaction temperature, the sol-gel reaction including mixing the sol-gel precursor, water, the aqueous colloidal silica suspension, and the catalyst to form a solution having particles therein may be performed without using any organic solvent, such that the reactants will not be gelatinized. Then, the hydrophobic agent is added to the solution to chemically modify the particles. Since the hydrophobic agent and water are insoluble, the modification reaction substantially occurs at the interface therebetween. After most of the particles are modified, the surfactant is added to the solution such that the remaining hydrophobic agent will be brought into the solution and the modification reaction may be fully completed. In addition, the surfactant can help the resulting hydrophobic antifouling coating material be more stable in the aqueous solution, thereby extending the retention time of the hydrophobic antifouling coating material. However, if no surfactant is added to the solution which has the modified particles therein, the high hydrophobicity of the modified particles (for example, the particles with lots of fluorine in their structure) may cause the particles to be unstable in the aqueous solution. Therefore, the mixture may be separated into two layers after reacting for a certain period time, such that applications of the hydrophobic antifouling coating material may be limited. In other words, the stable hydrophobic antifouling coating material in an aqueous solution with broader applications can be obtained by adding the surfactant during the manufacturing process. Furthermore, the aqueous colloidal silica helps to stabilize the hydrophobic antifouling coating material, e.g. the hydrophobic antifouling coating material can be stored at a higher temperature (60° C.) for a longer period without gelation. Note that a little amount of organic solvent may also be used during the process when forming a coating material with low VOC value, and the scope of the disclosure is not intend to be limiting.

In addition, according to the various embodiments of the disclosure, the hydrophobically modified particles formed by chemical modification are stabilized in the aqueous solution by adding the surfactant. Compared to a conventional method in which a hydrophobic material is simply absorbed on a surface (in other words, a non-chemical modification), the hydrophobic antifouling coating material of the disclosure has better weather-resistance since its hydrophobic structures are chemically bonded to the particles.

In one embodiment, the hydrophobic antifouling coating material not only has a much lower VOC value during the sol-gel reaction process, compatibility of the coating material with materials (such as aqueous materials, resins, paints, and the likes) is also increased. For example, the hydrophobic coating material may be coated onto a substrate and then dried to form a hydrophobic antifouling coating film. Alternatively, the commercially available paint is first coated on a substrate, and the hydrophobic antifouling coating material is then coated on the paint to protect it. In one embodiment, the hydrophobic antifouling coating film is transparent with great adherence to the substrate. In addition, a surface of the hydrophobic antifouling coating film has a good hydrophobicity. For example, the water contact angle of the hydrophobic antifouling coating film is larger than 90°, larger than 100°, or larger than 130°.

The hydrophobic antifouling coating film may perform include, but are not limited to, a high coating ability, adherence, hydrophobicity, antifouling, weather-resistance, solvent-resistance, and the like.

The following examples are intended to illustrate the disclosure more fully without limiting their scope, since numerous modifications and variations will be apparent to those skilled in this art.

EXAMPLES

Example 1

0.4 g of tetraethyl orthosilicate (TEOS), 0.277 g of water, 0.4 g of aqueous colloidal silica suspension (LUDOX® TMA colloidal silica, commercially available from Aldrich), and 0.32 g of HCl (0.1N) were mixed and reacted at room temperature for 3 hours, thereby obtaining a solution having particles therein. 0.8 g of 1H,1H,2H,2H-perfluorodecyltriethoxysilane (F-8261, commercially available from Degussa) was then added to the solution and reacted at room temperature for 2 hours, such that the particles were chemically modified. Next, 0.0384 g of sodium dodecyl sulfate (SDS) was dissolved in 24.94 g of water and added to the solution having the modified particles as an anion surfactant. The reaction was performed at room temperature for 12 hours to form a hydrophobic antifouling coating material which was stable in an aqueous solution. The hydrophobic antifouling coating material had an appearance of good dispersion without gelation at 60° C. for 14 days. The hydrophobic antifouling coating material had a solid content of 3.1%, and a VOC value greater than or equal to 300 g/L (tested and calculated according to ISO 11890-2 (10.3 Method 2)). Finally, the hydrophobic antifouling coating material was coated onto a glass substrate, then baked at 120° C. for 30 minutes, and then cooled down to obtain a coating film. The water contact angle of the coating film was measured as 113°. The hydrophobic antifouling coating material was coated onto a calcium silicate substrate, then baked at 120° C. for 30 minutes, and then cooled down to obtain a coating film. The water contact angle of the coating film was measured as 135°. Moreover, the hydrophobic antifouling coating material stored at 60° C. for 14 days was coated onto a glass substrate, then baked at 120° C. for 30 minutes, and then cooled down to obtain a coating film. The water contact angle of the coating film was measured as 118°. Accordingly, the hydrophobic antifouling coating material prepared by adding the aqueous colloidal silica suspension in the sol-gel reaction for forming the particles had a high stability. Reactant amounts and properties of the hydrophobic antifouling coating material, and the properties of the coating film utilizing the same, are tabulated in Table 1.

Example 2

Example 2 was substantially similar to Example 1, but in Example 2 the amount of aqueous colloidal silica suspension in the sol-gel reaction for forming the particles was increased to 0.8 g. The hydrophobic antifouling coating material in Example 2 also had an appearance of good dispersion without gelation at 60° C. for 14 days. The hydrophobic antifouling coating material had a solid content of 3.43%, and a VOC value greater than or equal to 300 g/L (tested and calculated according to ISO 11890-2 (10.3 Method 2)). Finally, the hydrophobic antifouling coating material was coated onto a glass substrate, then baked at 120° C. for 30 minutes, and then cooled down to obtain a coating film. The water contact angle of the coating film was measured as 112°. Moreover, the hydrophobic antifouling coating material stored at 60° C. for 14 days was coated onto a glass substrate, then baked at 120° C. for 30 minutes, and then cooled down to obtain a coating film. The water contact angle of the coating film was measured as 113°. Accordingly, the hydrophobic antifouling coating material prepared by adding the aqueous colloidal silica suspension in the sol-gel reaction for forming the particles had a high stability. Reactant amounts and properties of the hydrophobic antifouling coating material, and the properties of the coating film utilizing the same, are tabulated in Table 1.

Example 3

Example 3 was substantially similar to Example 1, but in Example 3 the amount of aqueous colloidal silica suspension in the sol-gel reaction for forming the particles was increased to 1.6 g. The hydrophobic antifouling coating material in Example 3 also had an appearance of good dispersion without gelation at 60° C. for 14 days. The hydrophobic antifouling coating material had a solid content of 3.47%, and a VOC value greater than or equal to 300 g/L (tested and calculated according to ISO 11890-2 (10.3 Method 2)). Finally, the hydrophobic antifouling coating material was coated onto a glass substrate, then baked at 120° C. for 30 minutes, and then cooled down to obtain a coating film. The water contact angle of the coating film was measured as 101°. Moreover, the hydrophobic antifouling coating material stored at 60° C. for 14 days was coated onto a glass substrate, then baked at 120° C. for 30 minutes, and then cooled down to obtain a coating film. The water contact angle of the coating film was measured as 111°. Accordingly, the hydrophobic antifouling coating material prepared by adding the aqueous colloidal silica suspension in the sol-gel reaction for forming the particles had a high stability.

Reactant amounts and properties of the hydrophobic antifouling coating material, and the properties of the coating film utilizing the same, are tabulated in Table 1.

Comparative Example 1

Comparative Example 1 was substantially similar to Example 1, but in Comparative Example 1 the sol-gel reaction for forming the particles was free of the aqueous colloidal silica suspension. In addition, the amount of TEOS in the sol-gel reaction was increased to 0.8 g. The hydrophobic antifouling coating material in Comparative Example 1 also had the appearance of good dispersion, but was gelatinized at 60° C. after 3 days. The hydrophobic antifouling coating material had a solid content of 2.4%, and a VOC value greater than or equal to 300 g/L (tested and calculated according to ISO 11890-2 (10.3 Method 2)). Finally, the hydrophobic antifouling coating material was coated onto a glass substrate, then baked at 120° C. for 30 minutes, and then cooled down to obtain a coating film. The water contact angle of the coating film was measured as 116°. Accordingly, the hydrophobic antifouling coating material prepared by the sol-gel reaction free of the aqueous colloidal silica suspension had a low stability. Reactant amounts and properties of the hydrophobic antifouling coating material, and the properties of the coating film utilizing the same, are tabulated in Table 1.

Comparative Example 2

Comparative Example 2 was substantially similar to Example 1, but in Comparative Example 2 the sol-gel reaction for forming the particles was free of the TEOS. In addition, the amount of aqueous colloidal silica suspension in the sol-gel reaction was increased to 1.6 g. The product in Comparative Example 2 had an appearance of poor dispersion with a viscous bottom, thereby failing to serve as a coating material. Accordingly, the TEOS is necessary to form the particles. In other words, the TEOS cannot be replaced by the aqueous colloidal silica suspension. Reactant amounts are tabulated in Table 1.

TABLE 1

| Examples | Reactants | | | | | | Properties | | | | |
| --- | --- | --- | --- | --- | --- | --- | --- | --- | --- | --- | --- |
| | TEOS (g) | Water (g) | 0.1N HCl (g) | Silica TMA (g) | F-8261 (g) | SDS (g) | Appearance | Water contact angle (°) | Stability (60° C.) | Solid content (%) | VOC (g/L) |
| Example 1 | 0.4 | 25.53 | 0.32 | 0.4 | 0.8 | 0.0384 | Good dispersion | 113 | No gelation for 14 days with a water contact angle 118° | 3.1 | ≥300 |
| Example 2 | 0.4 | 25.53 | 0.32 | 0.8 | 0.8 | 0.0384 | Good dispersion | 112 | No gelation for 14 days with a water contact angle 113° | 3.43 | ≥300 |
| Example 3 | 0.4 | 25.53 | 0.32 | 1.6 | 0.8 | 0.0384 | Good dispersion | 101 | No gelation for 14 days with a water contact angle 111° | 3.47 | ≥300 |
| Comparative Example 1 | 0.8 | 25.53 | 0.32 | 0 | 0.8 | 0.0384 | Good dispersion | 116 | Gelation after 3 days | 2.4 | ≥300 |
| Comparative Example 2 | 0 | 25.53 | 0.32 | 1.6 | 0.8 | 0.0384 | Poor dispersion with viscous bottom | NA* | NA* | NA* | NA* |

*Not available

Example 4

3 parts by weight of the hydrophobic antifouling coating material in Example 1 and 1 part by weight of another aqueous colloidal silica suspension (LUDOX® TMA colloidal silica, commercially available from Aldrich) were mixed, and then vacuum distilled at 60° C. for 1 hour to obtain another hydrophobic antifouling coating material with a largely enhanced solid content of 20.21% and a largely reduced VOC value of 15.2 g/L (tested and calculated according to ISO 11890-2 (10.3 Method 2)). The hydrophobic antifouling coating material in Example 4 also had an appearance of good dispersion without gelation at 60° C. for 14 days. Finally, the hydrophobic antifouling coating material was coated onto a calcium silicate substrate, then baked at 120° C. for 30 minutes, and then cooled down to obtain a coating film. The water contact angle of the coating film was measured as 146°. As shown in the comparison of Examples 1 and 4, the further addition of another aqueous colloidal silica suspension and the vacuum distillation may largely increase the solid content and largely reduce the VOC value of the hydrophobic antifouling coating material.

Comparative Example 3

1 part by weight of the hydrophobic antifouling coating material in Comparative Example 1 and 1 part by weight of another aqueous colloidal silica suspension (LUDOX® TMA colloidal silica, commercially available from Aldrich) were mixed, and then vacuum distilled at 60° C. for 1 hour to obtain another hydrophobic antifouling coating material. The hydrophobic antifouling coating material was coated onto a glass substrate, then baked at 120° C. for 30 minutes, and then cooled down to obtain a coating film. The coating film had a poor adherence with the glass substrate, e.g. half of the coating film peeled off the glass substrate. As shown in the comparison of Example 4, Comparative Example 1, and Comparative Example 3, if the hydrophobic antifouling coating material was prepared by the sol-gel reaction free of the aqueous colloidal silica suspension, adding the aqueous colloidal silica suspension to the coating material would degrade the coating film.

Example 5

Example 5 was substantially similar to Example 1, but in Example 5 the amount of hydrophobic agent (F-8261) was decreased to 0.04 g. The hydrophobic antifouling coating material in Example 5 also had an appearance of good dispersion. Finally, the hydrophobic antifouling coating material was coated onto a glass substrate, then baked at 120° C. for 30 minutes, and then cooled down to obtain a coating film. The water contact angle of the coating film was measured as 100°. Reactant amounts and properties of the hydrophobic antifouling coating material, and the properties of the coating film utilizing the same, are tabulated in Table 2.

Example 6

Example 6 was substantially similar to Example 1, but in Example 6 the amount of hydrophobic agent (F-8261) was decreased to 0.2 g. The hydrophobic antifouling coating material in Example 6 also had an appearance of good dispersion. Finally, the hydrophobic antifouling coating material was coated onto a glass substrate, then baked at 120° C. for 30 minutes, and then cooled down to obtain a coating film. The water contact angle of the coating film was measured as 114°. Reactant amounts and properties of the hydrophobic antifouling coating material, and the properties of the coating film utilizing the same, are tabulated in Table 2.

Example 7

Example 7 was substantially similar to Example 1, but in Example 7 the amount of hydrophobic agent (F-8261) was increased to 1.6 g. The hydrophobic antifouling coating material in Example 6 also had an appearance of good dispersion. Finally, the hydrophobic antifouling coating material was coated onto a glass substrate, then baked at 120° C. for 30 minutes, and then cooled down to obtain a coating film. The water contact angle of the coating film was measured as 114°. Reactant amounts and properties of the hydrophobic antifouling coating material, and the properties of the coating film utilizing the same, are tabulated in Table 2.

Example 8

Example 8 was substantially similar to Example 1, and the difference in Example 8 was the amount of hydrophobic agent (F-8261) being increased to 3.2 g. The hydrophobic antifouling coating material in Example 8 also had an appearance of good dispersion. Finally, the hydrophobic antifouling coating material was coated onto a glass substrate, then baked at 120° C. for 30 minutes, and then cooled down to obtain a coating film. The water contact angle of the coating film was measured as 115°. Reactant amounts and properties of the hydrophobic antifouling coating material, and the properties of the coating film utilizing the same, are tabulated in Table 2.

TABLE 2

| | Reactants | | | | | | Properties | |
|---|---|---|---|---|---|---|---|---|
| Examples | TEOS (g) | Water (g) | 0.1N HCl (g) | Silica TMA (g) | F-8261 (g) | SDS (g) | Appearance | Water contact angle (°) |
| Example 5 | 0.4 | 25.53 | 0.32 | 0.4 | 0.04 | 0.0384 | Good dispersion | 100 |
| Example 6 | 0.4 | 25.53 | 0.32 | 0.4 | 0.2 | 0.0384 | Good dispersion | 114 |
| Example 7 | 0.4 | 25.53 | 0.32 | 0.4 | 1.6 | 0.0384 | Good dispersion | 114 |
| Example 8 | 0.4 | 25.53 | 0.32 | 0.4 | 3.2 | 0.0384 | Good dispersion | 115 |

Example 9

An indoor paint (BEHR® NO. 1050, commercially available from Behr Process Corp.) was coated on a glass substrate to serve as a primer, and the hydrophobic antifouling coating material in Example 4 was coated on the prime paint to serve as a finishing paint. The primer and finishing paints were then baked at 120° C. for 30 minutes and then cooled down to form a coating film. The water contact angle of the coating film was measured as 144°.

Comparative Example 4

An indoor paint (BEHR® NO. 1050, commercially available from Behr Process Corp.) was coated on a glass substrate, then baked at 120° C. for 30 minutes, and then cooled down to form a coating film. The water contact angle of the coating film was measured as 97°. As shown in Comparison of Example 9 and Comparative Example 4, the hydrophobic antifouling coating material may largely enhance the hydrophobicity of the coating film.

Example 10

An outdoor paint (BEHR® NO. 4850, commercially available from Behr Process Corp.) was coated on a glass substrate to serve as a primer, and the hydrophobic antifouling coating material in Example 4 was coated on the primer to serve as a finishing paint. The primer and finishing paints were then baked at 120° C. for 30 minutes and then cooled down to form a coating film. The water contact angle of the coating film was measured as 135°.

Comparative Example 5

An outdoor paint (BEHR® NO. 4850, commercially available from Behr Process Corp.) was coated on a glass substrate, then baked at 120° C. for 30 minutes, and then cooled down to form a coating film. The water contact angle of the coating film was measured as 98°. As shown in Comparison of Example 10 and Comparative Example 5, the hydrophobic antifouling coating material may largely enhance the hydrophobicity of the coating film.

Example 11

An outdoor paint (BEHR® NO. 4050, commercially available from Behr Process Corp.) was coated on a glass substrate to serve as a primer, and the hydrophobic antifouling coating material in Example 4 was coated on the primer to serve as a finishing paint. The primer and finishing paints were then baked at 120° C. for 30 minutes and then cooled down to form a coating film. The water contact angle of the coating film was measured as 136°.

Comparative Example 6

An outdoor paint (BEHR® NO. 4050, commercially available from Behr Process Corp.) was coated on a glass substrate, then baked at 120° C. for 30 minutes, and then cooled down to form a coating film. The water contact angle of the coating film was measured as 85°. As shown in the comparison of Example 11 and Comparative Example 6, the hydrophobic antifouling coating material may largely enhance the hydrophobicity of the coating film.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A method of manufacturing a hydrophobic antifouling coating material, comprising:
   step (a) mixing a sol-gel precursor, water, a first aqueous colloidal silica suspension, and a catalyst to form particles comprising silica in a solution by a sol-gel reaction, wherein the sol-gel reaction is performed without using any organic solvent;
   step (b) chemically modifying the particles with a hydrophobic agent to form surface-modified particles; and
   step (c) adding a surfactant to the solution containing the surface-modified particles to form a hydrophobic antifouling coating material.

2. The method as claimed in claim 1, wherein steps (a), (b), and (c) are performed with the following reactant ratios:
   1 part by weight of the sol-gel precursor;
   50 to 99.9 parts by weight of the water;
   0.01 to 5 parts by weight of the catalyst;
   0.01 to 30 parts by weight of an aqueous colloidal silica of the first aqueous colloidal silica suspension;
   0.01 to 30 parts by weight of the hydrophobic agent; and
   0.01 to 5 parts by weight of the surfactant.

3. The method as claimed in claim 1, wherein steps (b) and (c) are performed without any organic solvent.

4. The method as claimed in claim 1, wherein the sol-gel precursor has a —SiOR or a —SiOH functional group, wherein R is $C_nH_{2n+1}$, and n is a positive integer.

5. The method as claimed in claim 1, wherein the hydrophobic agent is a silicon-based hydrophobic agent, a fluorine-based hydrophobic agent, a carbohydrate hydrophobic agent, a hydrocarbon hydrophobic agent, or combinations thereof.

6. The method as claimed in claim 1, wherein the surfactant is an anionic surfactant, a combination of an anionic surfactant and a cationic surfactant, a combination of an anionic surfactant and a non-ionic surfactant, a combination of anionic surfactant and an amphoteric surfactant, or combinations thereof.

7. The method as claimed in claim 1, wherein step (a) is performed at a temperature of 15° C. to 40° C. for a period of 1 hour to 3.5 hours.

8. The method as claimed in claim 1, wherein step (b) is performed at a temperature of 15° C. to 40° C. for a period of 1 hour to 2 hours.

9. The method as claimed in claim 1, wherein step (c) is performed at a temperature of 15° C. to 40° C. for a period of 12 hours to 24 hours.

10. The method as claimed in claim 1, further performing step (d) after step (c), and step (d) comprises:
    adding a second aqueous colloidal silica suspension to the hydrophobic antifouling coating material; and/or
    vacuum distilling the hydrophobic antifouling coating material to remove alcohol formed by the sol-gel reaction.

11. The method as claimed in claim 10, wherein the sol-gel precursor and an aqueous colloidal silica of the second aqueous colloidal silica suspension have a weight ratio of 1:0.01 to 1:30.

* * * * *